US007194820B2

(12) United States Patent
Schweiger et al.

(10) Patent No.: US 7,194,820 B2

(45) Date of Patent: Mar. 27, 2007

(54) PUNCH PRESS ALIGNMENT INSTRUMENT

(75) Inventors: Richard J. Schweiger, Andover, MN (US); Todd M. Knetsch, Lino Lakes, MN (US); Phillip R. Lysdahl, Anoka, MN (US); Christopher D. Morgan, Minneapolis, MN (US); Joseph C. Schneider, Elk River, MN (US)

(73) Assignee: Mate Precision Tooling Inc., Anoka, MN (US)

( * ) Notice: Subject to any disclaimer, the term of this patent is extended or adjusted under 35 U.S.C. 154(b) by 130 days.

(21) Appl. No.: 11/125,988

(22) Filed: May 9, 2005

(65) Prior Publication Data

US 2006/0248740 A1 Nov. 9, 2006

(51) Int. Cl.
*G01D 21/00* (2006.01)
*B23Q 3/00* (2006.01)
*B26F 1/14* (2006.01)

(52) U.S. Cl. ............................ 33/645; 33/613; 33/627; 33/655; 29/465; 83/684; 72/481.1

(58) Field of Classification Search .................. 33/645, 33/613, 626, 627, 628, 655; 83/684–691; 29/465; 72/481.3, 481.1
See application file for complete search history.

(56) References Cited

U.S. PATENT DOCUMENTS

| | | | | |
|---|---|---|---|---|
| 2,089,795 | A | 8/1937 | Hodge | |
| 2,381,062 | A * | 8/1945 | Kirsch | 83/637 |
| 3,126,776 | A | 3/1964 | Whistler et al. | |
| 3,200,508 | A * | 8/1965 | Harper | 33/371 |
| 3,273,168 | A * | 9/1966 | Gardner et al. | 623/38 |
| 3,342,091 | A * | 9/1967 | Schott et al. | 83/140 |
| 4,328,621 | A * | 5/1982 | Benjamin | 33/534 |
| 4,386,532 | A * | 6/1983 | Benjamin | 73/862.045 |
| 4,542,674 | A | 9/1985 | Omo, Jr. | |
| 5,920,999 | A * | 7/1999 | Hutter | 33/645 |
| 6,301,763 | B1 | 10/2001 | Pryor | |
| 6,442,859 | B1 * | 9/2002 | Hinzpeter et al. | 33/645 |
| 6,772,667 | B2 * | 8/2004 | Phlipot | 83/684 |
| 6,813,843 | B1 * | 11/2004 | Faubion | 33/638 |
| 6,842,994 | B2 * | 1/2005 | McInroy | 33/613 |

OTHER PUBLICATIONS

Mate: Thick Turret Line Up Tools; Catalog Oct. 1, 2002; Bublesher Mate Precision Tooling Inc. Anoka MN 55303.

* cited by examiner

*Primary Examiner*—Richard Smith
*Assistant Examiner*—Amy R. Cohen
(74) *Attorney, Agent, or Firm*—James V. Harmon

(57) ABSTRACT

A punch press alignment instrument has upper and lower cylindrical components that are associated for vertical displacement relative to one another. Both components have outer tool holder engaging surfaces which are to be aligned with one another so as to in turn align the tool holders of the punch press when the upper and lower components themselves are in alignment. Alignment elements, e.g., ridges and grooves provided on mating surfaces of the components confronting each other are brought into contact with one another to move the components of the instrument into mutual alignment. An alignment control member, e.g., a screw is preferably provided for progressively bringing the upper and lower components toward one another and an indicator such as a lamp, a dial indicator or an audible indicator is provided for denoting the spacing between the upper and lower components to thereby confirm the alignment of the tool holders.

28 Claims, 6 Drawing Sheets

PUNCH PRESS ALIGNMENT INSTRUMENT

FIELD OF THE INVENTION

This invention relates to the punch and die art and more particularly to an alignment instrument for a punch press.

BACKGROUND OF THE INVENTION

In many standard punch presses, a punch element is carried on an upper turret in alignment over a die that is mounted on a lower turret. The punch and die are both held in circular tool holders. Before the press can be operated, the tool holders must be placed in vertical alignment with one another so that the punch and die are in turn in alignment during operation. An alignment tool previously used by the assignee of the present invention included upper and lower parts in which the upper part was provided with a pair of laterally spaced apart downwardly extending cylindrical pins that were placed in corresponding cylindrical openings in the lower part of the device to align the tool holders. The device was cumbersome to operate and there was no means of indicating when the upper and lower parts of the device were in alignment. Alignment tolerances were also not as good as are sometimes required. In addition, there was no device for progressively moving the upper and lower parts toward one another or for automatically bringing them into progressively better alignment with one another.

In view of these and other deficiencies of the prior art, it is one object of the invention to provide an improved alignment instrument that will align a punch and a die in three ways simultaneously; horizontally on perpendicular x an y axes with respect to the base of the punch press as well as automatically rotating the die with respect to the punch about a common vertical axis.

Another object of the invention is the provision of a device for moving upper and lower components of an alignment instrument apart or toward one another under the control of an operator for bringing them into alignment.

Yet another object of the invention is the prevision of an indicator that operates automatically to indicate the alignment of two components of the instrument which in turn align a punch holder with a cooperating die holder.

A still further object of the invention is the provision of an improved punch press alignment instrument having a visual display that will indicate both partial and complete alignment of components.

These and other more detailed and specific objects of the invention will be apparent in view of the following description and drawings which illustrate by way of example a few of the various ways the invention can be carried out within the scope of the appended claims.

SUMMARY OF THE INVENTION

Briefly, the instrument comprises first and second mating parts or components, preferably cylindrical in shape, that are associated for longitudinal displacement relative to one another. Both parts have outer tool holder engaging portions which are to be aligned with one another to align the tool holders of the punch press when the first and second parts are in alignment. Alignment elements that are provided on mating surfaces of the parts confronting each other are brought into contact with one another to move the first and second parts of the instrument into mutual alignment. An alignment control member, e.g., a screw, is provided for progressively bringing the parts toward one another and an indicator such as a lamp, a dial indicator or an audible indicator is provided for denoting the spacing between the first and second parts to thereby confirm the alignment of the tool holders. In one preferred form of the invention, the alignment instrument includes upper and lower cooperating components that are each cylindrical in shape and connected together for longitudinal displacement relative to one another on a vertical axis as well as for rotation about the vertical axis. The indicator may consist of a dial indicator or one or more colored lights to indicate correct alignment.

DETAILED DESCRIPTION OF THE INVENTION

Figure 1:
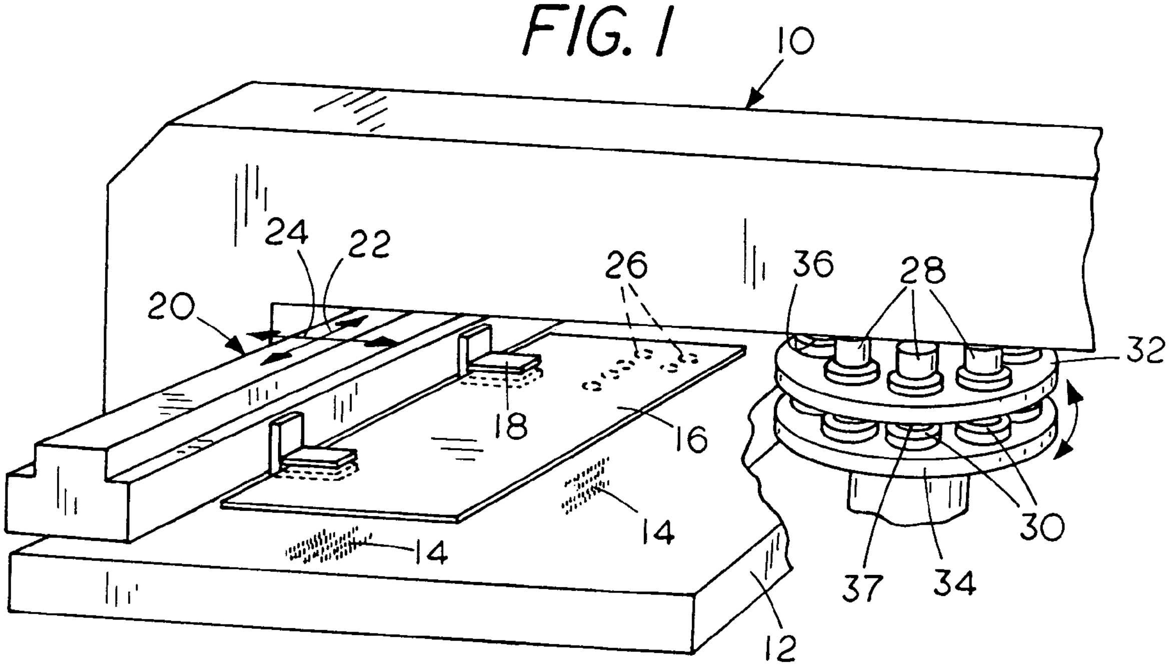
FIG. 1 is a perspective view of one form of punch press in which the invention can be used.

The invention can be employed in several different kinds of punch presses one of which is illustrated by way of example in FIG. 1. The punch press indicated generally by the numeral 10 includes a fixed base 12 that may be provided with vertically extending fibers 14 only a few of which are shown for supporting workpiece 16 that is securely held by a pair of clamps 18 which are in turn connected to a positioning rail 20 that is moved rapidly during operation to a series of programmed positions along horizontal x and y axes 22 and 24 under the automatic control of a computer (not shown) to punch a series of openings 26 in the workpiece 16 or otherwise form the workpiece each time the workpiece is brought into the proper position between a punch 28 and cooperating die 30. The punches 28 are distributed circumferentially on a circular punch turret 32 and the dies 30 in turn are each supported on a lower turret 34 in alignment below one of the punches. During operation, the turrets 32 and 34 are rotated together under control of the machine-operating computer to place the pre-selected punch and die sets sequentially in an operating position 36 where the punching operation is preformed to produce a pre-selected pattern of openings 26 in the workpiece 16. The punch press 10 as described hereinabove is of any suitable commercial available type and the invention can, of course, be used with any of a variety of punch presses, the construction and operation of which is well known to those skilled in the art.

Figure 7:
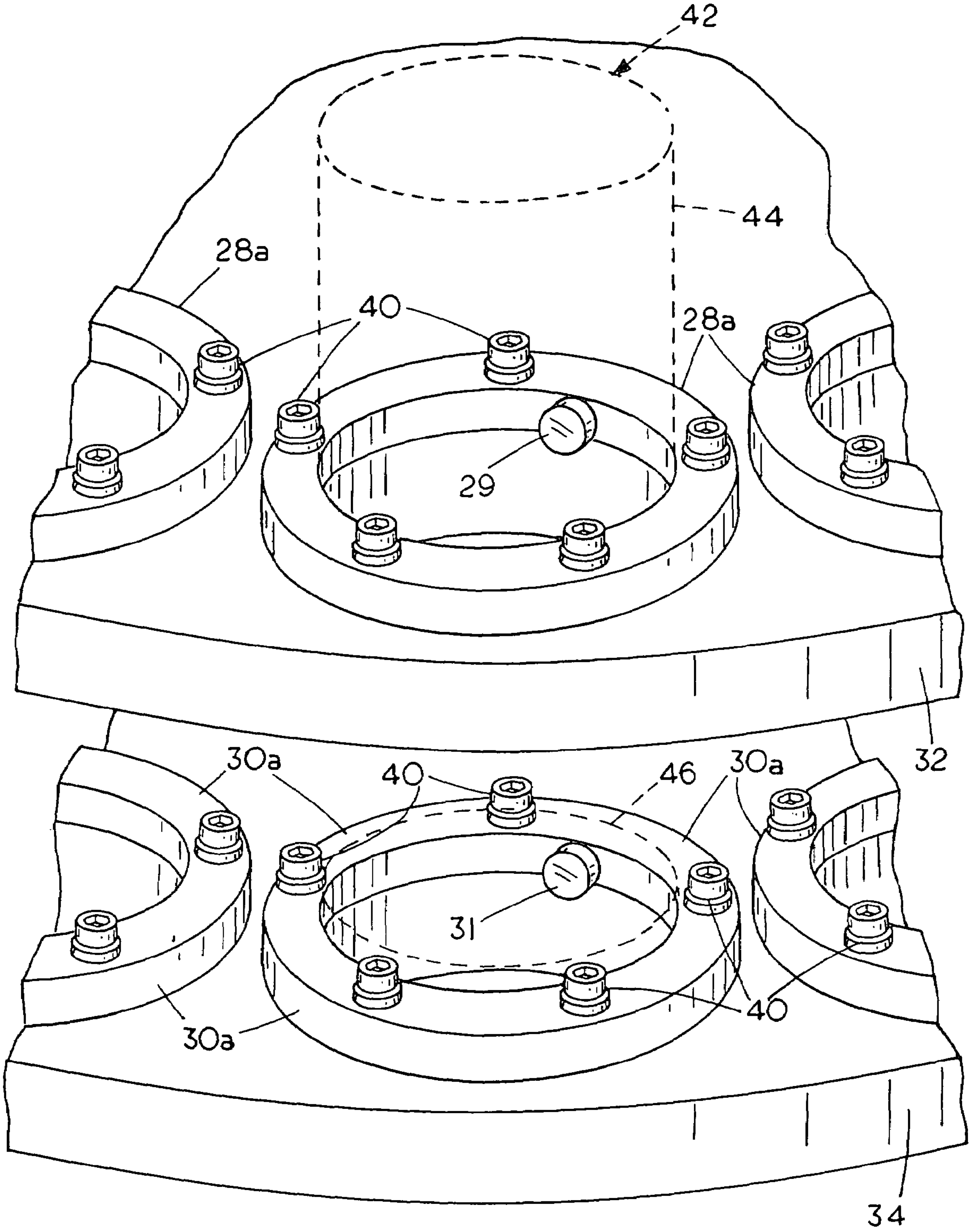
FIG. 7 is a partial perspective view of the punch press turret area showing the positions taken by the upper and lower components of the instrument just prior to aligning the tool holders.

As best shown in FIG. 7, punches 28 are held in a series of circumferentially arranged annular punch holders 28*a* and the dies are held in annular circumferentially arranged die holders 30*a*, each of which can be secured to its supporting turret once aligned with one another by means of fasteners in this case cap screws 40. To place upper and lower cooperating pairs of tool holders 28*a* and 30*a* in alignment with one another, the alignment instrument 42 of the present invention is set in the tool holders 28*a*, 30*a* and aligned, as will be described below, so as to thereby place each punch and die set into alignment with one another. The cap screws 40 can then be tighten to maintain the alignment once the alignment instrument 42 has been removed.

The alignment instrument will now be described with references to FIGS. 2–5. The alignment instrument 42 includes an upper component 44 and a lower component 46 each generally cylindrical in shape and having outer cylindrical alignment surfaces 48 and 50 respectively which fit within the tool holders 28*a* and 30*a* respectively during use. The upper component or part 44 includes a central chamber 52 within which is provided a battery pack 54, a control circuit 56 (FIG. 3) described more fully in connection with FIG. 11 and an indicator light 58 which projects through an opening in a removable sheet metal cover 60. The upper and lower components 44, 46 are provided with complementary mating surfaces comprising a pair of upwardly projecting downwardly opening slots 43 and 45 in the upper component 44 and two pair, i.e., four vertically disposed upwardly extending complementary teeth 43*a* and 45*a* that project upwardly from the top surface of the lower component 46*a* into the mating slots 43 and 45. It can be seen that the teeth 43*a* and 45*a* are in nonparallel (in this case perpendicular) relationship as are the cooperating slots 43 and 45. The teeth 43*a* and 45*a* are provided only on the outer annular portion 46*a* of the lower component 46 and the slots are similarly positioned to extend upwardly from the lower surface of the upper component 44 of the instrument.

Figure 3:
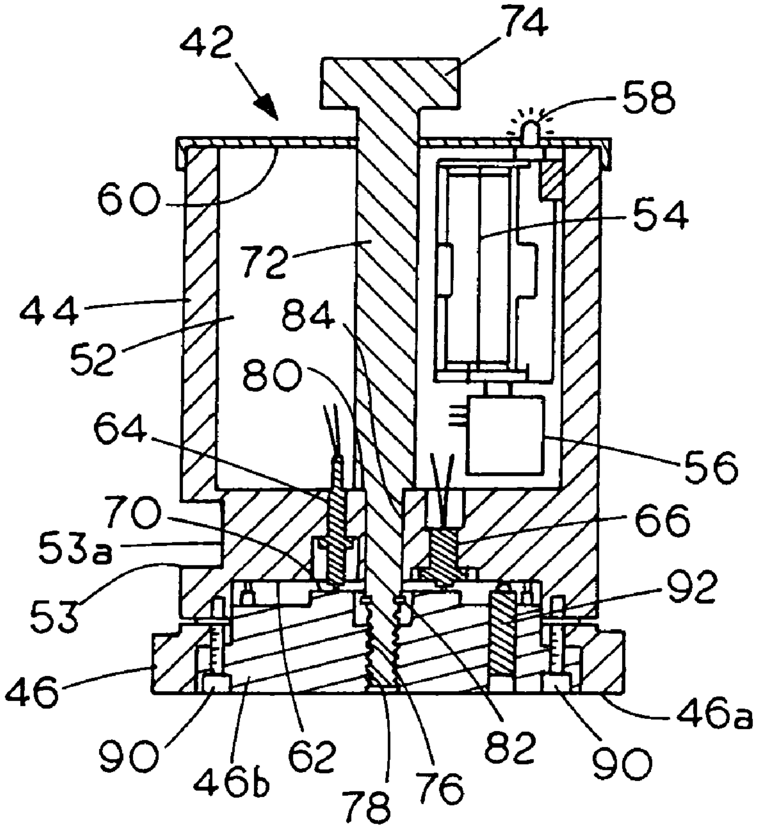
FIG. 3 is a vertical sectional view taken on line 3—3 of FIG. 2 with the upper and lower components in contact.
Figure 3A:
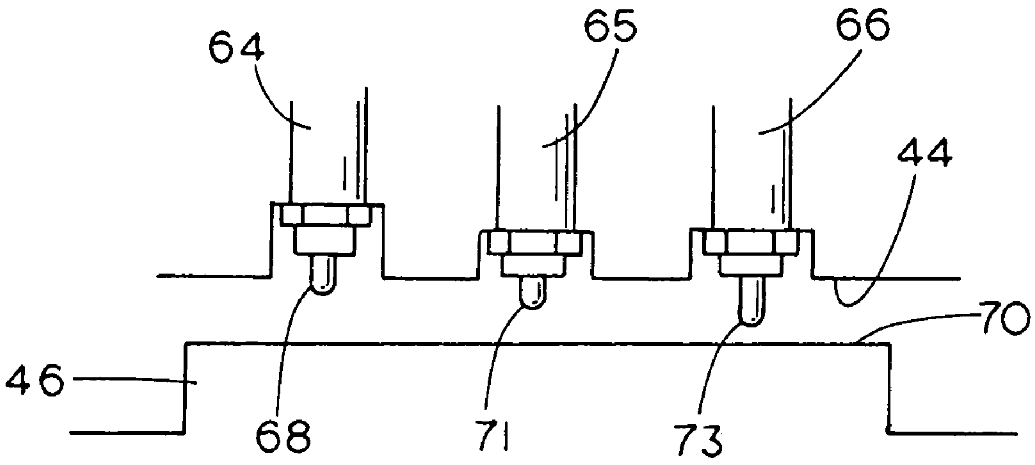
FIG. 3A is a greatly enlarged diagrammatic view showing tactile alignment switches on a larger scale.
Figure 4:
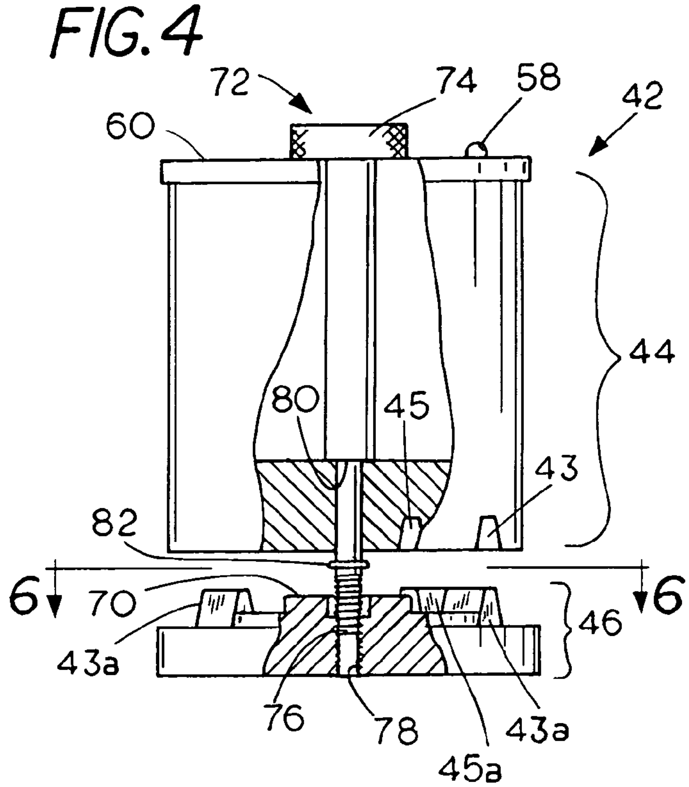
FIG. 4 is a side elevational view of FIG. 2 partly in section.

Extending downwardly through a bottom surface 62 component of 44 are a plurality (typically three) alignment indicators comprising contact sensing switches, two of which, 64 and 66, can be seen in FIG. 3. FIG. 3*a* shows how actuator buttons 68, 71 and 73 of all the switches 64, 65 and 66 are placed at different elevations so as to be actuated sequentially by contact with a flat horizontally disposed upper switch contact surface 70 of the lower component 46. Because the switch contact buttons 68, 71 and 73 are at different elevations, as the upper component 44 is lowered, switch 66 will be actuated first, then switch 65 and finally switch 64 will be actuated. To establish the correct zero point, each of the switches 64–66 is threaded into the upper component 44. The switch 64 is then threaded up or down until it turns on exactly when the upper and lower components 44 and 46 are aligned and in contact with one another. The other two switches 65 and 66 are then set to project different distances below switch 64 to indicate when the components are coming close to alignment.

The upper and lower components 44 and 46 of the instrument 42 are brought toward one another during operation by means of a control member consisting of a screw 72 having an operating knob 74 that is turned manually and a threaded section 76 at its lower end that is screw threaded into a vertical threaded bore 78 in the lower component 46. The screw 72 is provided with a shoulder 80 that bears against the bottom wall of the chamber 52. A snap ring 82 on screw 72 keeps the screw within a bored opening 84 (FIG. 3) at the center of the upper component 44. The lower component 46 consists of an annular outer portion 46*a* and a central disc 46*b* which is secured to 46*a* by fasteners such as screws 90 (FIG. 3). Optionally provided on the lower component 46 are plurality, in this case three spaced apart spring loaded plungers 92 each having an upwardly projecting downwardly compressible spring loaded plunger element 94 that exerts an upward force on part 44 as parts 44 and 46 are brought together. The spring loaded plunger 94 functions as lifting units to raise the upper component 44 from the lower component 46. The travel of the plungers is great enough to lift the upper component 44 a sufficient distance to compensate for rotational inaccuracies of the upper turret with respect to the lower turret when the turrets are rotated into the loading position, i.e., when not in the active position shown at 36 in FIG. 1. Alternatively, a spring can be placed between clip 82 and component 44.

Component 44 includes a vertical longitudinally extending outwardly opening alignment slot 49 on its outer surface 48 that during operation is engaged on a positioning lug 29 which extends centrally from an inside surface of the punch holder 28*a*. Similarly, the lower component 46 is provided with a vertical outwardly opening slot 51 which is engaged during use over a centrally extending alignment lug 31 that projects centrally from die holder 38. The lug 29 thus provides a zero reference point to establish the correct rotational position of the punch holder 28*a*. The positions of the upper and lower components 44 and 46 just prior to alignment are indicated by dashed lines in FIG. 7. The upper component 44 is also provided with a horizontally extending outwardly opening slot 53 with a vertically disposed inner surface 53*a* (FIG. 8).

Figure 8:
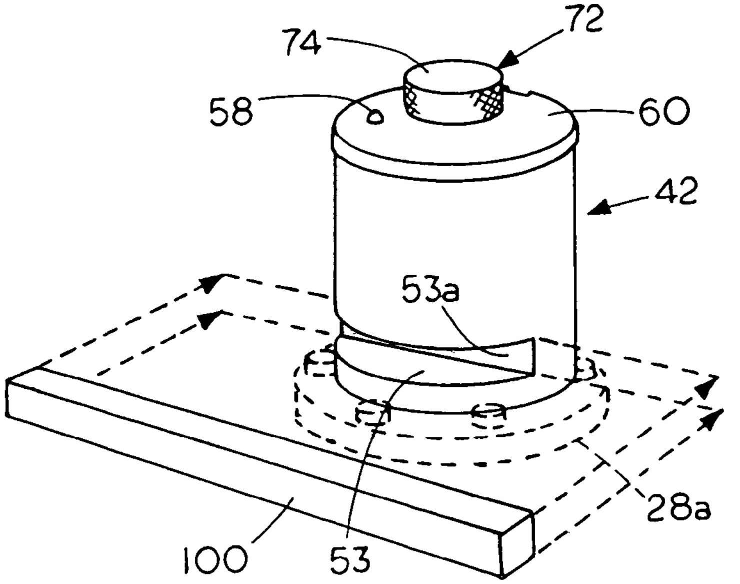
FIG. 8 shows how an alignment bar is placed in contact with the alignment instrument.
Figure 9:
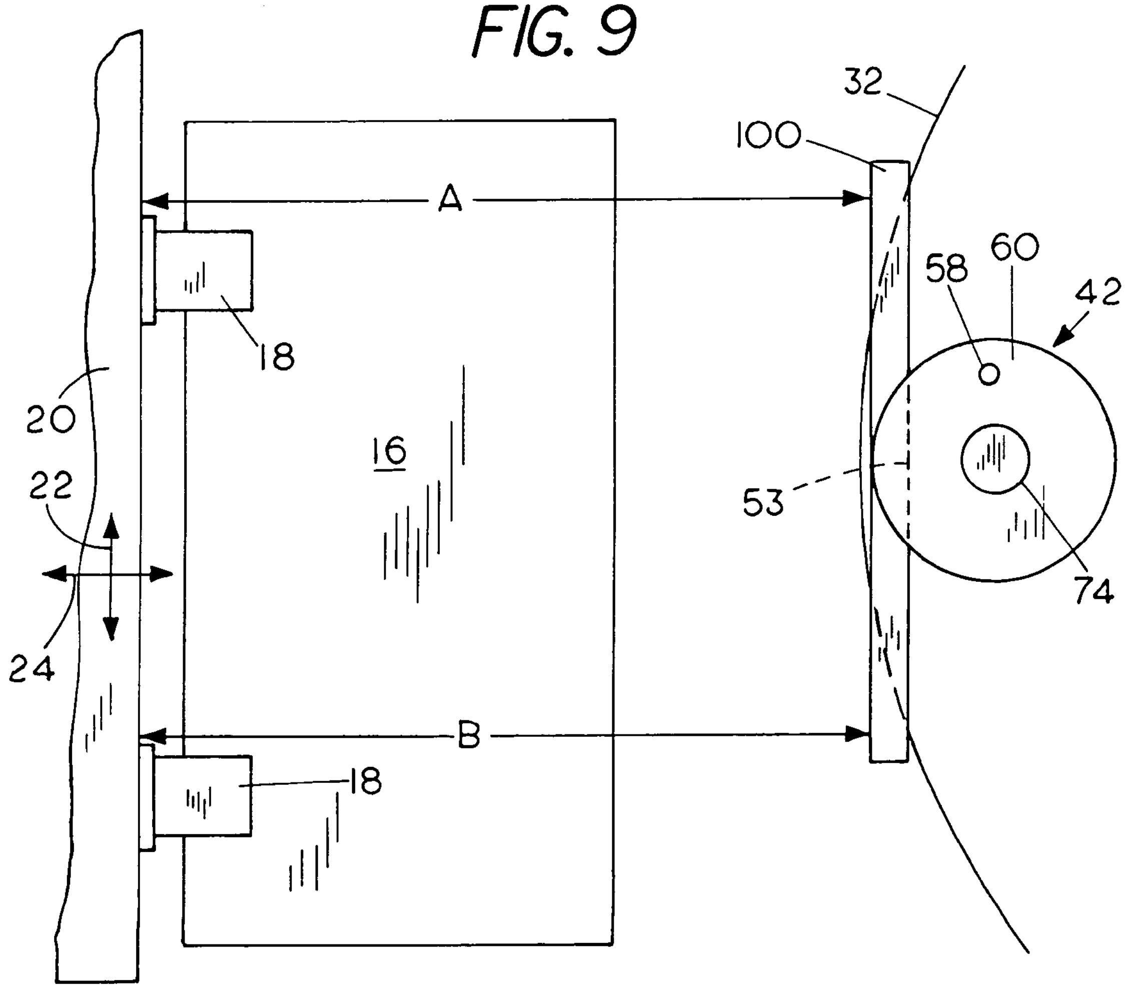
FIG. 9 is a diagrammatic plan view showing how the instrument is aligned about a vertical axis with respect to the punch press base.

Refer now to FIGS. 8 and 9. When the upper portion 44 the instrument is to be aligned with the positioning rail 20, an alignment bar 100 is placed manually in the slot 53 and is held firmly against the inner surface 53*a*. The bar 100 is then aligned with positioning rail 20, e.g., by making measurements at (A) and (B) until (A) and (B) are equal. The dimensions (A) and (B) can be measured using an ordinary linear scale, a dial indicator or by means of a suitable optical distance measuring system. Once (A) and (B) are measured and found to be equal, the punch holder 28*a* is properly aligned about a vertical axis 6. The caps screws 40 holding the upper tool holders 28*a* in place can then be tightened to securely lock the upper component 44 of the instrument in place on the upper turret 32. With the lower caps screws loose, the lower component 46 of the instrument is placed in the die holder 30*a* with the lug 31 in slot 51. The alignment control screw 72 is then turned downwardly by hand using the knob 74 so that the threads 76 at its lower end draw the upper component 44 downwardly into contact with the lower component 46.

Figure 10:
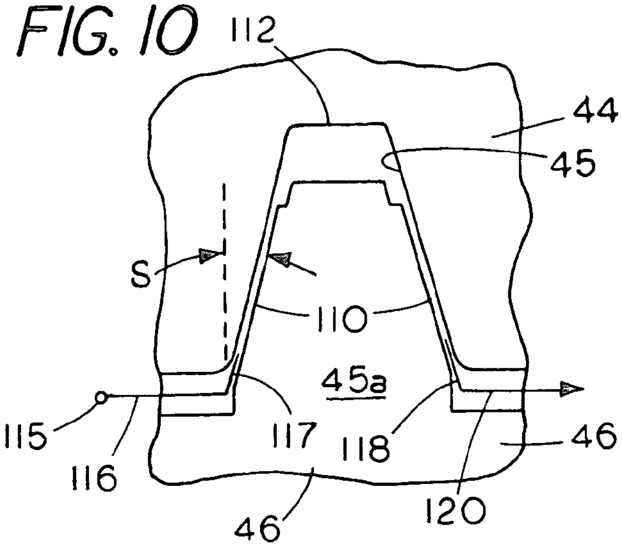
FIG. 10 is a greatly enlarged side elevational view taken on line 10—10 of FIG. 5.

Refer now to FIG. 10 which shows how each of the teeth 43*a*, 45*a* are tapered by providing tapered side walls 110 that converge toward one another proceeding toward its upper surface 112 so that each of the teeth is wider at its base. It was found suitable to taper each of the sidewalls at an angle S which can be about 15° to the vertical as shown in FIG. 10.

Figure 2:
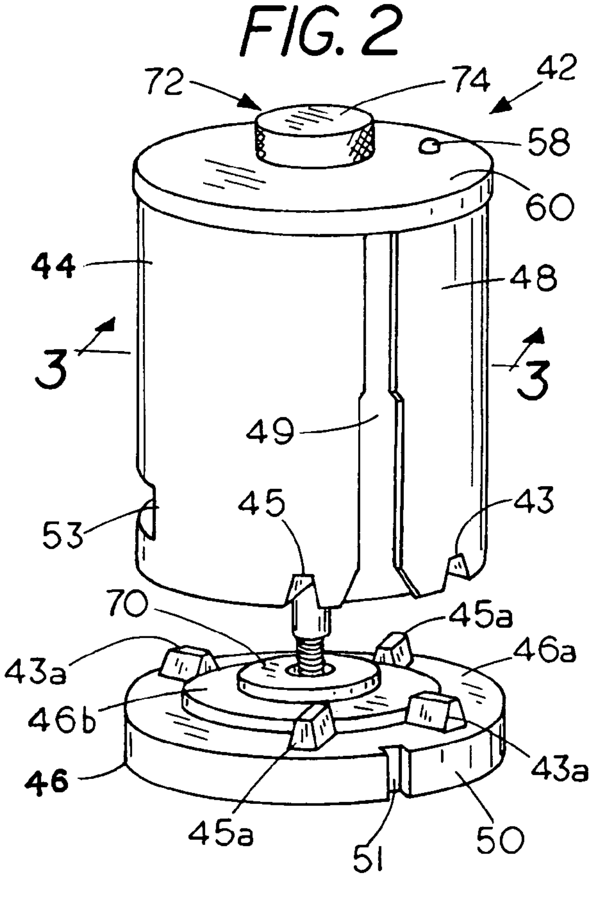
FIG. 2 is a perspective view of the alignment instrument with the upper and lower components spaced apart from one another for clarity of illustration.

It will be noted that when the upper and lower components 44 and 46 approach one another as shown in FIG. 2 and 10, the tapered walls of the teeth 45*a* as well as teeth 43*a* will gradually be brought into contact with the slots 43 and 45. Since the teeth 43*a* are not aligned with teeth 45*a* (in this case are at right angles thereto) the upper and lower components will be brought into coaxial alignment on horizontal x and y axes simultaneously. At the same time, the engagement between the sidewalls 110 of the teeth with the corresponding inner walls of the slots 43 and 45 will rotate the lower component 46 slightly bringing it into perfect rotational alignment with the upper component 44 about a common vertical axis that is orthogonal to the x and y axes. Thus, alignment is achieved between the upper and lower components 44 and 46 simultaneously on two mutually perpendicular horizontal axes while angular alignment is achieved about a common vertical axis.

Figure 6:
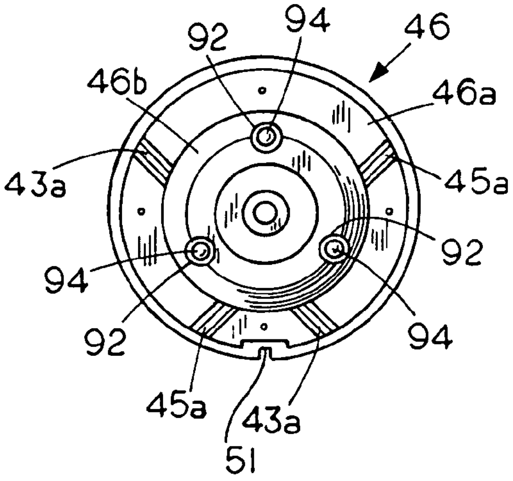
FIG. 6 is a horizontal sectional view taken on line 6—6 of FIG. 4 on a slightly smaller scale.
Figure 5:
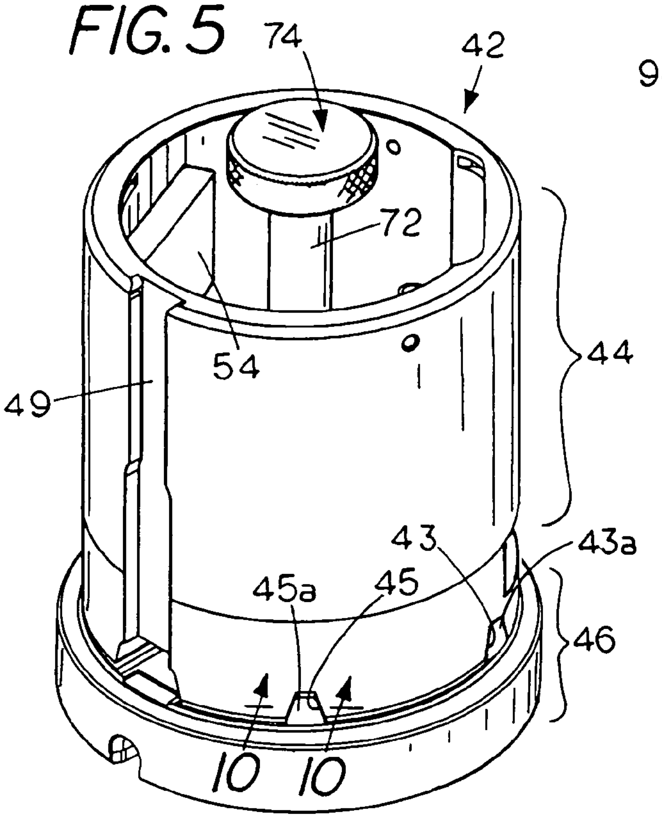
FIG. 5 is a perspective view of the invention with the cover removed.

The instrument can be manufactured in various ways, but it has been found highly advantageous first to machine the sidewalls 48 and 50 of the instrument 42 including both the upper component 44 and the lower component 46 while part of a single cylinder of steel and to grind the outer surfaces 48 and 50 concentric with one another to form the tool holder engaging surfaces and thereafter sever the upper component 44 from the lower component 46 by electrical wire discharged machining (EDM). Alternatively, the components 44 and 46 can be securely reconnected after being severed and then finished on their outer surfaces. In EDM machining, a high voltage electrical potential is established between the part being machine and an electrical discharge wire that is held under tension. To simplify machining, the teeth and the slots are each positioned somewhat laterally of center as shown in FIGS. 2 and 6. For example, in separating the parts 44, 46 in FIG. 10 an electrical discharge wire 115 shown in end view is first moved laterally at 116, then upwardly at a 15° angle as shown at 117, laterally across the top of the teeth 45*a* toward the right, downwardly on a 15° incline, horizontally at 120 until the parts are separated. The surfaces of the teeth and slots, i.e., ridges and grooves, can be left unpolished or if desired can be polished by hand with an abrasive surface such as an Arkansas stone. EDM has been found highly effective in maintaining alignment between the upper 44 and lower 46 components of the instrument 42. The concentric machining of the surfaces 48 and 50 while the instrument is in one piece or subsequent to splitting it will assure concentricity and hence proper alignment of the tool holders after the components 44 and 46 have been separated. Other precise machining methods can be used in place of EDM if desired.

Figure 11:
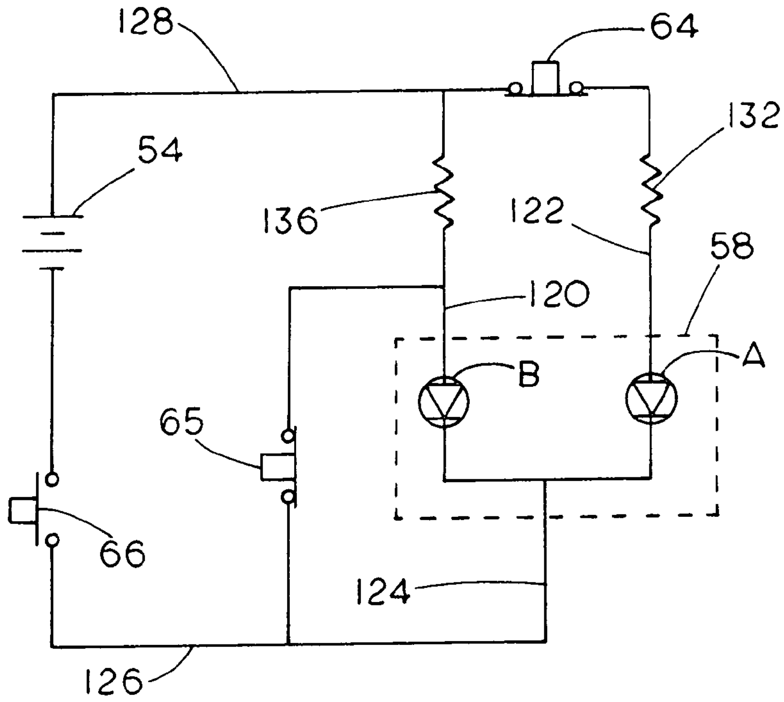
FIG. 11 is a circuit diagram for the indicator.

Refer now to FIG. 11 which shows the circuit diagram for the indicator light 58. In this case the indicator light 58 is a three lead tri-color light emitting diode (LED) having a green diode component (A) and red component (B) which are connected in parallel so that the light or diode module 58 has three leads 120, 122 and 124 which are wired across the battery 54 (two AA cells) by conductors 126 and 128. Wired in series with the diodes are two dropping resisters 130 and 132 that are connected in parallel through the normally closed switch 64 to the battery 54 via conductor 128. The resistors can be 47-ohm ¼ watt resistors. Wired between the resistor 136 and the diode (B) is the normally closed switch 65. In series with the battery 54 is a normally open switch 66. While any suitable switches can be used, tactile switches such as DB 5 series switches by Omron Corporation of Schaumberg, Ill. can be used. The LED 58 can be a model LTL-30EHJ unit by Light-On Electronics, Inc.

In operation, as the knob 74 of the control 72 is turned bringing the upper and lower components 44 and 46 closer together, the switch 66 is closed first through engagement with the switching surface 70 which turns on diode (A) to produce a red light. Next, as the upper and lower components 44, 46 are brought into even better alignment, the switch 65 is opened thereby turning on the diode (B) so as to produce a yellow light through a combination of (A) and (B). Finally, when the upper and lower components 44 and 46 are in perfect alignment, the switch 64 is opened so as to turn off the current to the diode (A) leaving only (B) a green light which indicates that the components 44 and 46 of the instrument 42 and the tool holders 28*a* and 30*a* which are in contact with them are in alignment with each other. The caps screws 40 that hold the punch holder 28*a* have already been tightened or can now be tightened to lock the punch holder 28*a* in place on the turret 32. Cap screws 40 that hold the die holder 30*a* can now be tightened to secure the die holder 30*a* in place on the turret 34. The alignment of the punch and die is now assured. The instrument is then removed from the punch and die holders 28*a*, 30*a*. This process is continued until all the cooperating pairs of punch and die holders have been locked in alignment on the turrets 32 and 34. The punch and die sets can then be placed in the holders with assurance that they are in alignment. The punch press 10 is then operated conventionally.

While the alignment sensors 54–56 in the example given are contact sensing switches, the alignment of tool holders as determined by the spacing between the upper and lower components 44 and 46 can be sensed in other ways, e.g., optically, magnetically, by ultrasonic sensing or even with a feeler gauge to thereby indicate the degree of alignment or misalignment between the upper and lower components 44 and 46. Alignment can be indicated either visually as already described or audibly, e.g., by means of a sound-producing device to provide a tone or series of beeps.

Figure 12:
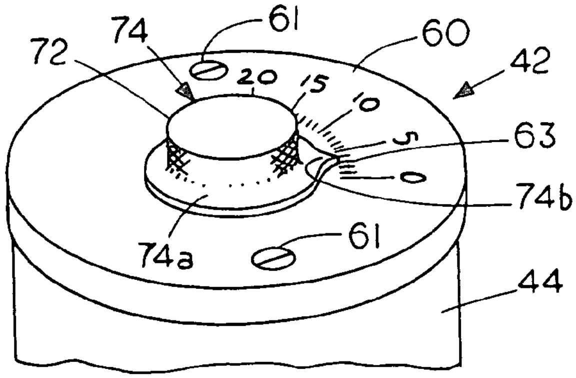
FIG. 12 is another form of an alignment indicator.

Refer now to FIG. 12 which illustrates another embodiment of the invention that employs a different kind of alignment indicator. In this case, the knob 74 at the top of the control 72 has rigidly connected to its lower edge a thin metal flange 74*a* with pointer 74*b*. The top of the cover 60 which in this case is rigidly fastened to the top of the upper component 44 by screws or other fasteners 61 is provided with a circular scale 63 which comprises printed indicia or other markings to indicate the spacing between the upper and lower components of the instrument 42. When the pointer 74*b* reaches zero on the scale the upper and lower components are aligned. The knob 74 includes a force-limiting clutch like that commonly used in a micrometer which is adapted to release upon reaching a predetermined torque limit to reduce and preferably eliminate distortion of the apparatus, e.g., the screw 72 or switches 64–66 or the surface 70.

The invention has proved to be highly successful by providing a dimensional precision that has been improved to the point where alignment devices previously available are not good enough to match tolerances that can be achieved with the invention.

In addition, the present invention provides inherent precision while at the same time having a low manufacturing cost, ease of obtaining accurate alignment of undisputed quality and simplicity of operation.

In one typical application, the instrument 42 is used in the following way. First, working in the loading area 37 (FIG. 1), the cap screws 40 of a cooperating pair of punches including punch holder 28*a* and die holder 30*a* are tightened just barely snug. Second, the lower component 46 is installed into the die holder 30*a*. The lower cap screws 40 are then tightened securely. Third, the upper component 44 is slid into the upper holder 28*a*. The alignment control 72 is then rotated about five turns but without clamping parts 44 and 46 together. The light 58 should not be lit. Next the instrument 42 is rotated into the operating station under the ram at 36 in FIG. 1. The turrets 32, 34 should not be rotated when 44 and 46 are clamped tightly together.

The control knob 74 is then tighten snug by hand so that the light 54 moves through red, yellow and stops on green. When the light 58 is glowing green, the alignment bar 100 is placed in the slot 53 and held securely against surface 53*a*. The component 44 is then rotated slightly to twist the holders 28*a* and 30*a* until the alignment bar 100 is aligned with the positioning rail 20 as shown in FIG. 9, i.e., so that (A) and (B) are equal. A rod or other handle (not shown) can be attached to the component 44 to facilitate rotation. Next, as many of the upper cap screws 40 as can be reached should be tightened to secure the punch holder 28*a* in place on the turret 32. Alignment of the bar 100 should then be re-checked after which the alignment bar 100 can be removed.

Next, the knob 74 is loosened about two turns making sure that the light 58 is not lit. The turrets 32 and 34 are then turned to bring the instrument 42 back to the loading station 37. Both upper and lower cap screws 40 are then tightened with a standard hex wrench. Clearances should then be checked again to make sure nothing has moved, but if it has previous steps should be repeated. If nothing has moved, all of the cap screws 40 should be torqued to a desired setting and held with an anti-rotational compound or by other means. Alignment should then be re-checked to confirm that nothing has moved. If it has, previous steps should again be repeated to obtain the proper alignment. Alignment can be confirmed by making sure the LED turns green when the knob 74 is tightened. The station being aligned is now in alignment and the instrument 42 can be removed.

Many variations in the present invention within the scope of the appended claims will be apparent to those skilled in the art once the principles described herein are read and understood.

What is claimed is:

1. A punch press alignment instrument for aligning cooperating tool holders comprising, first and second mating parts connected for longitudinal displacement relative to one another, each said part has a tool holder engaging surface for being aligned with one another to align the tool holders connected thereto when the first and second parts are aligned with one another, alignment elements on the first and second parts that are positioned to confront one another and having complementary mating surfaces adapted to contact one another for moving the first and second parts into mutual alignment, an alignment control member for progressively bringing the parts toward one another and an indicator to denote the spacing between the first and second parts to thereby confirm alignment of said tool holders.

2. The instrument of claim 1 wherein the control member is a screw that is rotatably mounted in the first part of the instrument and screw threaded into the second part of the instrument.

3. The apparatus of claim 2 wherein the control member includes a force-limiting clutch adapted to release upon reaching a predetermined torque limit to reduce or eliminate distortion of said apparatus.

4. The apparatus of claim 1 wherein the indicator is an indicator lamp that is operatively associated with the first and second parts for being turned on when the parts are in alignment with one-another.

5. The instrument of claim 4 wherein the indicator comprises a plurality of said lamps that are operatively associated with the parts of the instrument to be turned on sequentially as the parts of the instrument become progressively better aligned.

6. The instrument of claim 1 wherein the alignment elements comprise at least one projection on the first part and a complementary mating recess on the second part for bringing the first and second parts into alignment with one another.

7. The instrument of claim 6 wherein the projection comprises at least one tapered tooth having inclined side walls and a base that is wider than a free end thereof and the recess comprises a slot with incline side walls constructed and arranged to fit the tooth.

8. The apparatus of claim 1 wherein the indicator is a dial indicator operatively associated with the alignment control member for indicating when the first and second mating parts are brought into contact with one another.

9. The apparatus of claim 1 wherein the first and second parts are formed from a single piece of material that has said tool holder engaging surfaces thereon and said piece of material is severed to define said first and second parts.

10. The apparatus of claim 9 wherein the complementary mating surfaces are formed during the severing of the piece of material into said first and second parts.

11. A punch press alignment instrument comprising, an upper body component for being mounted in an upper turret of a punch press, a lower body component for being mounted in a lower turret of a punch press below the upper component, the upper and lower components of the instrument are adapted to be moved toward one another during use and being rotatable relative to one another on a longitudinal axis, each of the upper and lower components of the instrument having tool holder contacting portions for aligning tool holders of the punch press when the upper and lower components are in alignment with one another, mating alignment elements confronting one another on a bottom end of the upper component and on a top end of the lower component for being placed in contact with one another to bring the upper and lower components into angular alignment around a common longitudinal axis, and on mutually perpendicular x and y axes that are orthogonal to the longitudinal axis, an alignment control member extending between the upper and lower components of the instrument for progressively moving the upper and lower components toward one another and, an indicator for denoting the spacing between the upper and lower components to thereby indicate the degree of alignment between said upper and lower components such that the upper and lower tool holders can be placed into alignment with one another thereby.

12. The instrument of claim 11 wherein the mating alignment elements comprise at least one projection on one of the instrument components and at least one cooperating indentation on the other instrument component constructed and arranged to fit one another for aligning the upper and lower components of the instrument.

13. The instrument of claim 12 wherein the projection comprises at least one tapered tooth having inclined side walls with a base that is wider than a free end thereof and the recess comprises a slot with inclined side walls constructed and arranged to fit the tooth.

14. The instrument of claim 11 wherein the control member is a screw that is rotating mounted in one component of the instrument and screw threaded into the other component of the instrument.

15. The apparatus of claim 11 wherein the indicator is an indicator lamp that is operatively associated with the upper and lower components for being turned on when the components are in alignment with one another.

16. The instrument of claim 11 wherein the indicator comprises a plurality light emitting elements that are operatively associated with the components of the instrument to be turned on sequentially as the components of the instrument become progressively better aligned.

17. The instrument of claim 11 wherein the alignment elements comprise a plurality of nonparallel projections on one component and complementary mating recesses on a second of said component positioned to confront the projections for bringing the upper and lower components into alignment with one another.

18. The apparatus of claim 11 wherein the indicator is a dial indicator operatively associated with the alignment control member for indicating the alignment between the upper and lower mating components.

19. The apparatus of claim 11 wherein the alignment elements comprise at lease two, nonparallel, elongated projections on one component, mating slots constructed to fit the projections on a second component and the indicator comprises at least one lamp operatively associated with said components for indicating the alignment thereof.

20. The apparatus of claim 11 wherein the indicators comprise a plurality of light emitting elements operatively associated with the components for being energized sequentially as the components become progressively better aligned.

21. The apparatus of claim 20 where in the light emitting elements are light emitting diodes.

22. The apparatus of claim 11 wherein the upper and lower components are formed from a single piece of material that has said tool holder contacting portions thereon and said piece of material is severed to define said upper and lower components.

23. The apparatus of claim 22 wherein the mating alignment elements are formed during the severing of the piece of material into said components.

24. The apparatus of claim 22 wherein the upper and lower components are rejoined where severed and said tool holder contacting portions are surface finished.

25. A punch press alignment instrument for aligning cooperating tool holders comprising, first and second mating parts that are moveable toward one another along an axis that extends between a punch and die of the punch press, each said part has a tool holder engaging surface for being aligned with one another to align the tool holders connected thereto when the upper and lower parts are aligned with one another, alignment elements on the upper and lower parts that are positioned to confront one another and have complementary mating surfaces adapted to contact one another for moving the first and second parts into mutual alignment, an indicator to denote the spacing between the first and second parts to thereby confirm alignment of said tool holders, and the indicator being operatively associated between the first and second parts for actuation responsive to the distance between said parts for thereby indicating alignment of said first and second parts with one another.

26. The instrument of claim 25 wherein the indicator indicates changes in the degree of alignment as the first and second parts become progressively better aligned.

27. An instrument for aligning a punch holder with a die holder of a punch press comprising, first and second alignment components that are severed from a single piece of material along a separation line dividing the piece of material, said piece of material having a mounting element on one side of the separation line for the punch holder and a mounting element on the other side of the separation line for the die holder, and the components have cooperating alignment elements confronting one another that are of complementary shapes adapted to fit each other for moving and aligning the first and second components with each other to thereby align the punch holder with the die holder.

28. The instrument of claim 27 wherein the alignment elements comprise at least one ridge on the first component and a cooperating groove on the second component.

* * * * *